US007807759B2

(12) United States Patent  (10) Patent No.: US 7,807,759 B2
Shin et al. (45) Date of Patent: Oct. 5, 2010

(54) BRANCHED AND SULPHONATED MULTI BLOCK COPOLYMER AND ELECTROLYTE MEMBRANE USING THE SAME

(75) Inventors: Chong-kyu Shin, Daejeon (KR); Young-ji Tae, Seoul (KR); Jae-hyuk Chang, Daejeon (KR); Bong-keun Lee, Daejeon (KR); Chang-ae Cho, Daejeon (KR); Sang-hyun Lee, Seoul (KR); Hwang-chan Yoo, Daejeon (KR); Go-young Moon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 466 days.

(21) Appl. No.: 11/282,488

(22) Filed: Nov. 21, 2005

(65) Prior Publication Data
US 2006/0134494 A1  Jun. 22, 2006

(30) Foreign Application Priority Data
Dec. 22, 2004 (KR) .................. 10-2004-0110487

(51) Int. Cl.
C08J 5/22 (2006.01)
H01M 8/10 (2006.01)
C08G 65/40 (2006.01)
C08G 75/24 (2006.01)
C08G 65/38 (2006.01)
C08L 81/08 (2006.01)

(52) U.S. Cl. .................. 525/535; 521/25; 521/27; 429/492; 429/493; 528/219; 528/391; 528/171; 528/206; 525/534

(58) Field of Classification Search .............. 429/33, 429/492, 493; 521/25, 27, 21; 528/219, 528/391, 171, 206; 525/535, 534
See application file for complete search history.

(56) References Cited
U.S. PATENT DOCUMENTS
3,960,815 A * 6/1976 Darsow et al. .............. 528/174
(Continued)
FOREIGN PATENT DOCUMENTS
EP  0 111 317  6/1984
(Continued)

OTHER PUBLICATIONS
Miyatake, et al. "Novel Sulfonated Poly(arylene ether): A Proton Conductive Polymer Electrolyte Designed for Fuel Cells" Macromolecules 2003, 36, 9691-9693; 2003 American Chemical Society.

Primary Examiner—Harold Y Pyon
Assistant Examiner—Michael Pepitone
(74) Attorney, Agent, or Firm—McKenna Long & Aldridge LLP

(57) ABSTRACT

The present invention relates to a branched and sulphonated multi block copolymer and an electrolyte membrane using the same, more precisely, a branched and sulphonated multi block copolymer composed of the repeating unit represented by formula 1 and a preparation method thereof, a hydrogenated branched and sulphonated multi block copolymer, a branched and sulphonated multi block copolymer electrolyte membrane and a fuel cell to which the branched and sulphonated multi block copolymer electrolyte membrane is applied.

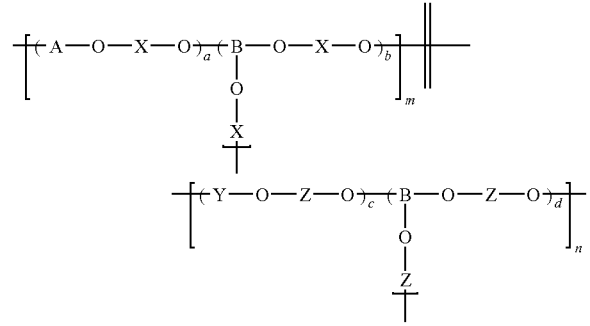

The electrolyte membrane of the present invention has high proton conductivity and excellent mechanical properties as well as chemical stability, so it can be effectively used for the production of thin film without the decrease of membrane properties according to the increase of sulfonic acid group since it enables the regulation of the distribution, the location and the number of sulfonic acid group in polymer backbone.

16 Claims, 2 Drawing Sheets

U.S. PATENT DOCUMENTS

| | | | |
|---|---|---|---|
| 4,625,000 | A | 11/1986 | Chao et al. |
| 5,219,978 | A * | 6/1993 | Hay et al. .................. 528/128 |
| 5,879,554 | A | 3/1999 | Loffelmann et al. |
| 6,090,895 | A | 7/2000 | Mao et al. |
| 6,172,180 | B1 * | 1/2001 | Hancock et al. ............ 528/391 |
| 2002/0091225 | A1 | 7/2002 | McGrath et al. |
| 2003/0044669 | A1 * | 3/2003 | Hidaka et al. ................. 429/33 |
| 2004/0048129 | A1 * | 3/2004 | Taft et al. ..................... 429/33 |
| 2004/0186262 | A1 | 9/2004 | Maier et al. |
| 2005/0208416 | A1 * | 9/2005 | Bender ................... 430/270.1 |
| 2005/0282919 | A1 * | 12/2005 | Cao et al. ..................... 521/27 |
| 2006/0249444 | A1 * | 11/2006 | Maier et al. ............ 210/500.27 |
| 2007/0010631 | A1 * | 1/2007 | Watanabe et al. ........... 525/390 |

FOREIGN PATENT DOCUMENTS

| | | | |
|---|---|---|---|
| JP | 5-01149 | | 1/1993 |
| JP | 10-251621 | | 9/1998 |
| JP | 2003-113226 | * | 4/2003 |

* cited by examiner

[FIG. 1]
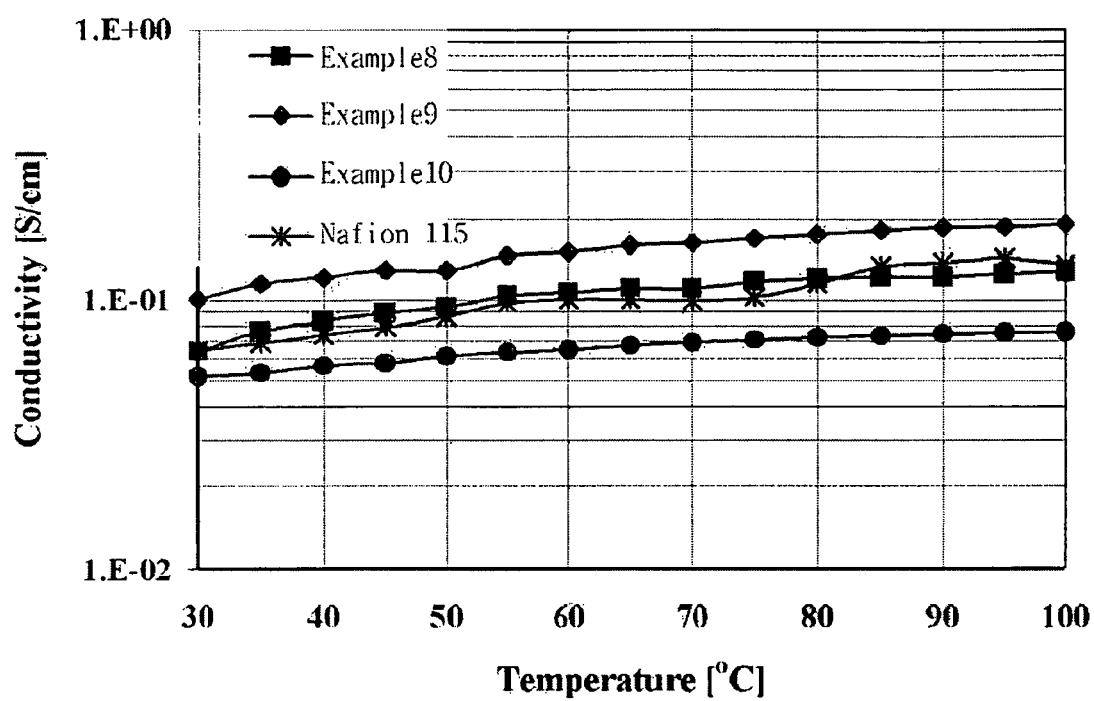

[FIG. 2]
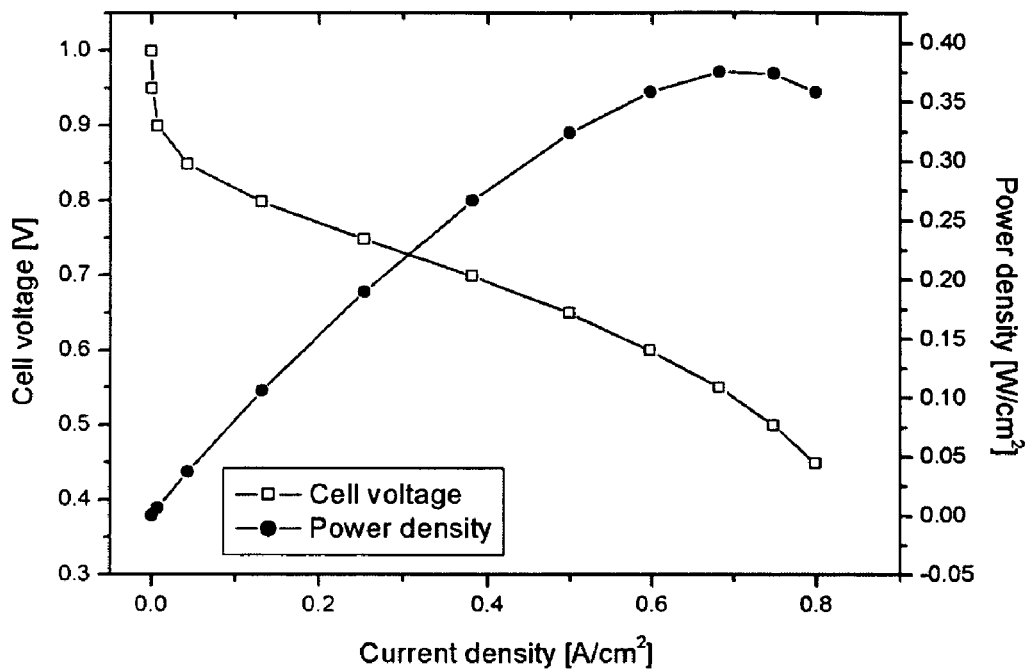
[FIG. 3]
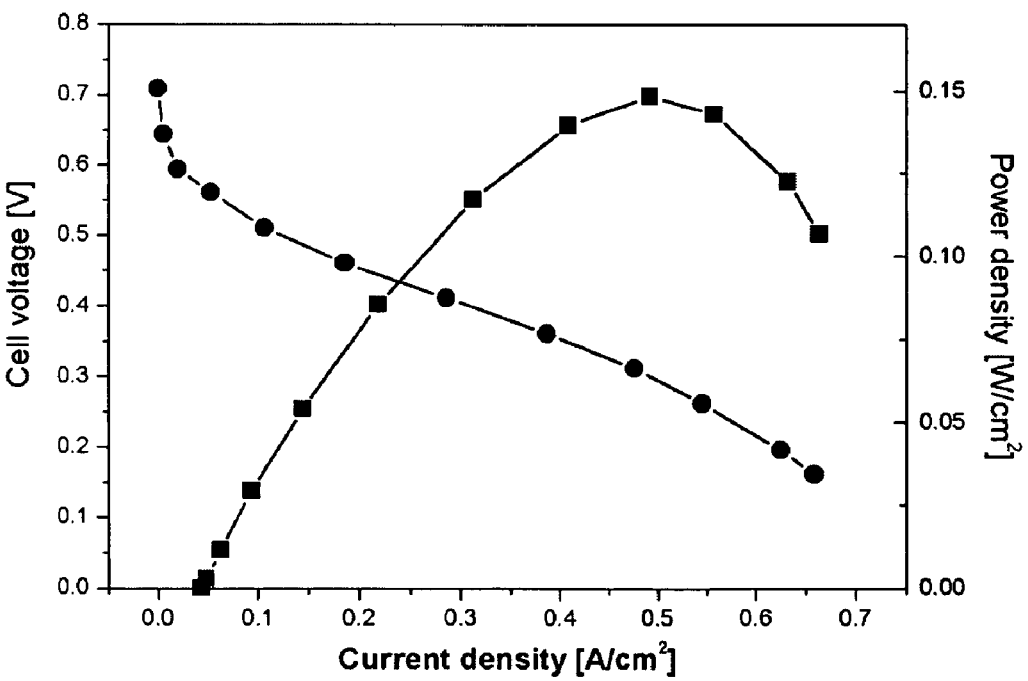

BRANCHED AND SULPHONATED MULTI BLOCK COPOLYMER AND ELECTROLYTE MEMBRANE USING THE SAME

This application claims the benefit of the filing date of Korean Patent Application No. 10-2004-0110487, filed on Dec. 22, 2004 in the Korean Intellectual Property Office, the disclosure of which is incorporated herein in its entirety by reference.

TECHNICAL FIELD

The present invention relates to a branched and sulphonated multi block copolymer and an electrolyte membrane using the same, more precisely, a branched and sulphonated multi block copolymer which has high level of proton conductivity and excellent mechanical properties, and is chemically stable and composed of repeating unit represented by the following formula 1 that facilitates the effective production of thin film without reducing the properties with the increase of sulfonic acid group, and is also characterized by easy regulation of the distribution, the location and the number of sulfonic acid group in high molecular backbone thereof, a preparation method of the same, a hydrogenated branched and sulphonated multi block copolymer, a branched and sulphonated multi block copolymer electrolyte membrane and a fuel cell to which the branched and sulphonated multi block copolymer electrolyte membrane is applied.

[Formula 1]

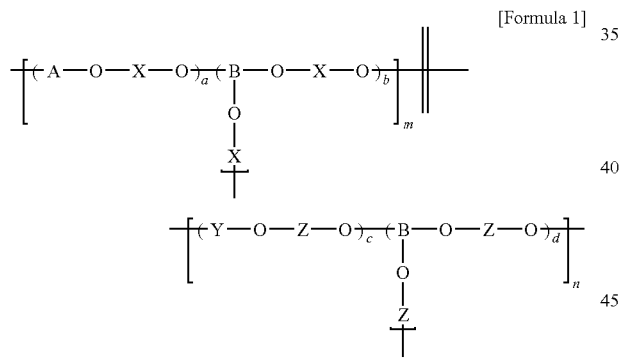

In the formula 1,
A, X, and Y are independently

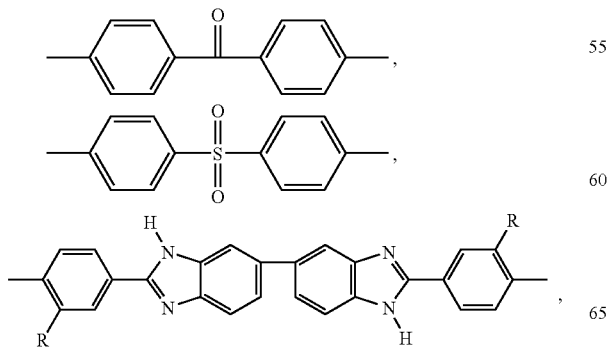

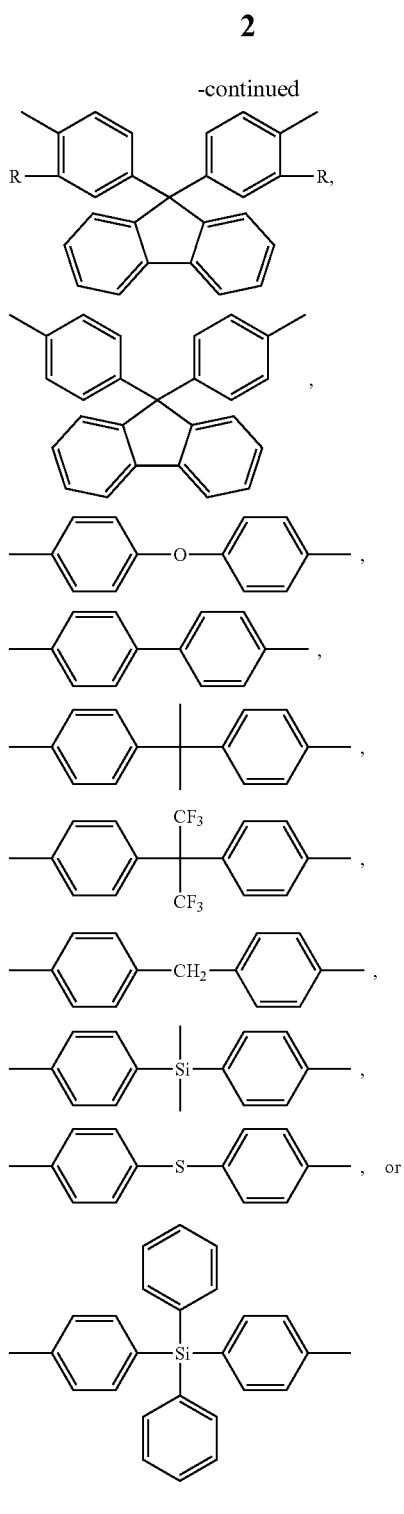

(Wherein, R is —NO$_2$ or —CF$_3$),

Z is 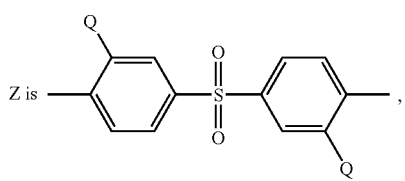

-continued

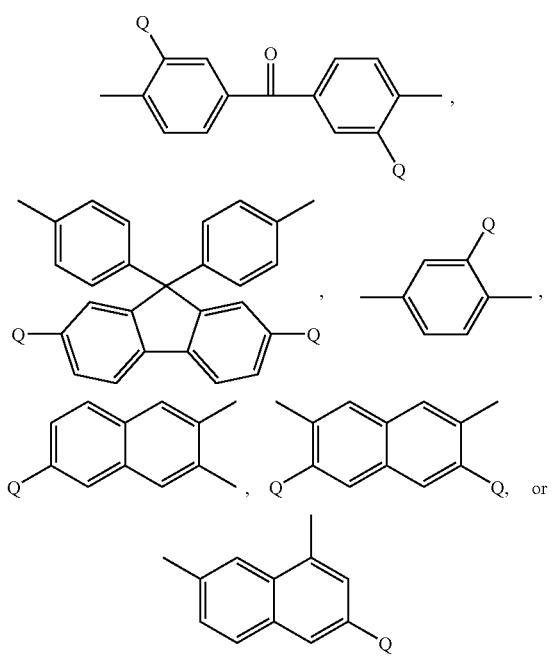

(Wherein, Q is —SO₃H, —SO₃⁻M⁺, —COOH, —COO⁻M⁺, —PO₃H₂, —PO₃H⁻M⁺, or —PO₃²⁻2M⁺, and M is Na or K), B is

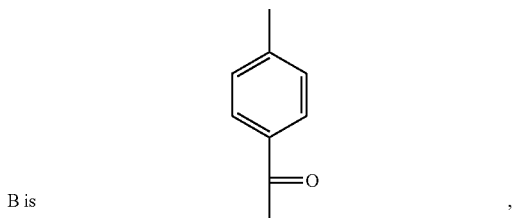

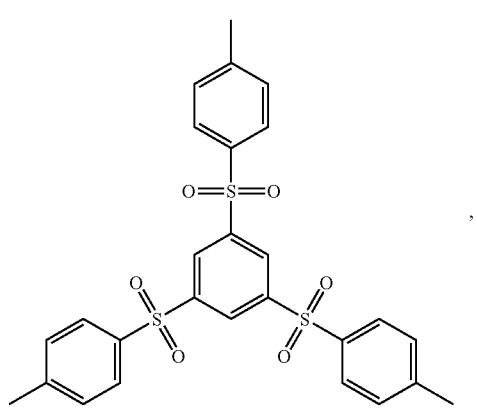

-continued

, or

, b/a is 0<b/a<1, d/c is 0<d/c<1, m is 1≦m<100, and n is 1≦n<100.

BACKGROUND ART

A fuel cell is an energy conversion device that converts the chemical energy of a fuel directly into the electrical energy, which has been studied and developed as the next generation energy source characterized by high energy efficiency and pro-environmental properties lowering the discharge of pollutants.

Among fuel cells, the polymer electrolyte membrane fuel cell (PEMFC) comes into the spotlight as a portable power supply, power supplies for automobile and home owing to its low operating temperature, fast drive and water-tightness which has been a target of the use of solid electrolyte. This fuel cell is a high power fuel cell having high current density, compared with those of other fuel cells, and has numbers of advantages such as; it is operated at under 100° C., it has simple structure, fast start, fast response and excellent durability, and it can use methanol or natural gas, in addition to hydrogen, as a fuel. Besides, owing to the possibility of miniaturization attributed to high output density, studies have been undergoing to develop the fuel cell as a portable fuel cell.

The polymer electrolyte membrane fuel cell is composed of two electrodes and a polymer membrane acting as an electrolyte. The polymer electrolyte membrane is activated by using polymer membrane, where sulfonic acid group (—SO₃H) is introduced, as electrolyte and using hydrogen or methanol as a fuel. In particular, the polymer electrolyte membrane fuel cell using methanol as a fuel is called 'direct methanol fuel cell (DMFC)', which is the system converting methanol directly to electricity by electrochemical reaction, satisfying our expectation for simplification and loading response of the system.

In general, the electrolyte membrane used for the polymer electrolyte membrane fuel cell is divided into two groups; perfluorinated polymer electrolytes and hydrocarbon polymer electrolytes. The perfluorinated polymer electrolyte is chemically stable owing to the strong binding force between carbon and fluoride (C—F) and shielding effect which is the typical character of fluoride atom, and has excellent mechanical properties in addition to the excellent conductivity as a proton exchange membrane. Thus, the perfluorinated polymer electrolyte has been industrially used as a polymer membrane for the polymer electrolyte membrane fuel cell. Nafion (perfluorinated sulfonic acid polymer) provided by Du Pont, U.S.A. is one of representative examples for commercial proton exchange membrane, which has been most widely used today owing to its' excellent ionic conductivity, chemical stability and ion selectivity. Although the perfluorinated polymer electrolyte membrane has excellent capacity, it has problems of limitation in commercial use because of its high price, high methanol crossover and descending efficiency of the polymer membrane over 80° C. Thus, studies on hydrocarbon ion exchange membrane which can compete with the perfluorinated polymer electrolyte membrane in the aspect of price have been actively undergoing.

The polymer electrolyte membrane for fuel cell should be stable under any circumstances required for the operation of the fuel cell, so the available polymer is limited in aromatic polyether, etc. During the operation of fuel cell, electrochemical stress such as hydrolysis, oxidation, reduction, etc, causes decomposition of the polymer membrane, resulting in the decrease of the capacity of the fuel cell. So, an attempt has been made to apply polyetherketone or polyethersulfone poly arylene ether polymer having excellent chemical stability and mechanical properties to fuel cell.

U.S. Pat. No. 4,625,000 describes the post-sulfonation process of polyethersulfone as a polymer electrolyte membrane. However, the post-sulfonation of polymer has limitations in regulation of the distribution, the location and the number of sulfonic acid group (—$SO_3H$) of the polymer backbone and has a problem of descending properties of the electrolyte membrane with the increase of sulfonic acid groups causing the increase of the water content in the membrane.

U.S. Pat. No. 6,090,895 describes the cross-linking process of a sulfonated polymer such as sulfonated polyetherketone, sulfonated polyethersulfone and sulfonated polystyrene, etc. However, it could not propose an effective way to produce thin film using the sulfonic acid polymer cross-linked as the above.

EP No. 1,113,17 A2 describes a block copolymer electrolyte membrane composed of blocks having and not having sulfonic acid. A block copolymer composed of aliphatic block and aromatic block was sulfonated by using sulfuric acid, which could not control the location and the number of sulfonic acid groups in the polymer backbone and caused break-down of aliphatic polymer bond during sulfonation.

Japanese professor Watanabe described in his paper (Macromolecules 2003, 36, 9691-9693) the method of introducing sulphonic acid group selectively into the location of fluorene in a polymer containing a fluorene compound by using chlorosulfonic acid ($ClSO_3H$). However, the method has a problem of the decrease of physical properties, precisely, the degree of sulfonation is increased by the method, resulting in the increase of the content of water in thin film, reducing the physical properties of the polymer electrolyte.

US Patent No. 2004-186262 describes the preparation method for a multi block copolymer electrolyte membrane in which hydrophobic block composed of hydrocarbon and hydrophilic block composed of hydrocarbon and having ionic conductivity are cross-linked. According to the method, a copolymer in the form of —$SO_3K$ was converted into —$SO_2Cl$ by using thionylchloride ($SOCl_2$), taking advantage of low solubility of a multi block copolymer, to produce thin film. The produced thin film was hydrolyzed again into a polymer thin film in the form of —$SO_3H$ to endow proton conductivity to the thin film. But, the method has also problems, even though it enables the production of polymer thin film having ionic conductivity from multi block copolymer, the production process is complicated, thionylchloride is a toxic material, and the mechanical integrity of the polymer thin film is far behind the requirement for the operation of fuel cell.

DISCLOSURE OF THE INVENTION

To solve the problems of the above methods, it is an object of the present invention to provide a branched and sulphonated multi block copolymer having high proton conductivity and excellent mechanical properties and at the same time being chemically stable, a preparation method of the same, a branched and sulfonated multi block copolymer electrolyte membrane produced by using the above copolymer, and a preparation method thereof.

It is another object of the present invention to provide a branched and sulphonated multi block copolymer enabling the regulation of the distribution, the location and the number of sulphonic acid group in polymer backbone and the production of thin film without the decrease of physical properties even with the increase of sulphonic acid group, a preparation method of the same and a branched and sulphonated multi block copolymer electrolyte membrane produced by using the same.

It is a further object of the present invention to provide a fuel cell produced by using the above electrolyte membrane which has excellent proton conductivity, mechanical properties and chemical stability.

To achieve the above objects, the present invention provides a branched and sulphonated multi block copolymer composed of the repeating unit represented by formula 1.

[Formula 1]

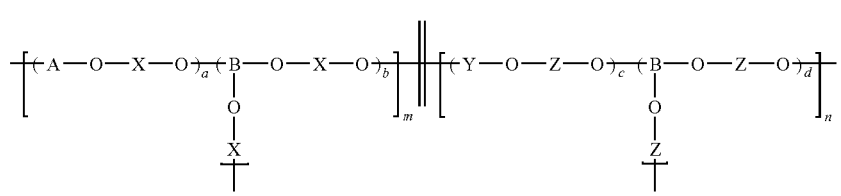

In the formula 1,

A, X, and Y are independently

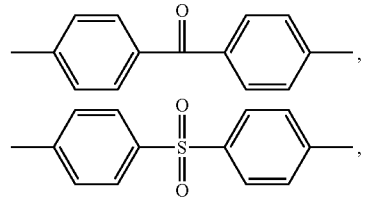

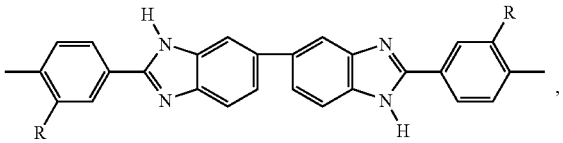

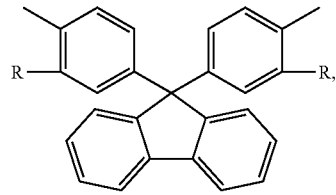

-continued
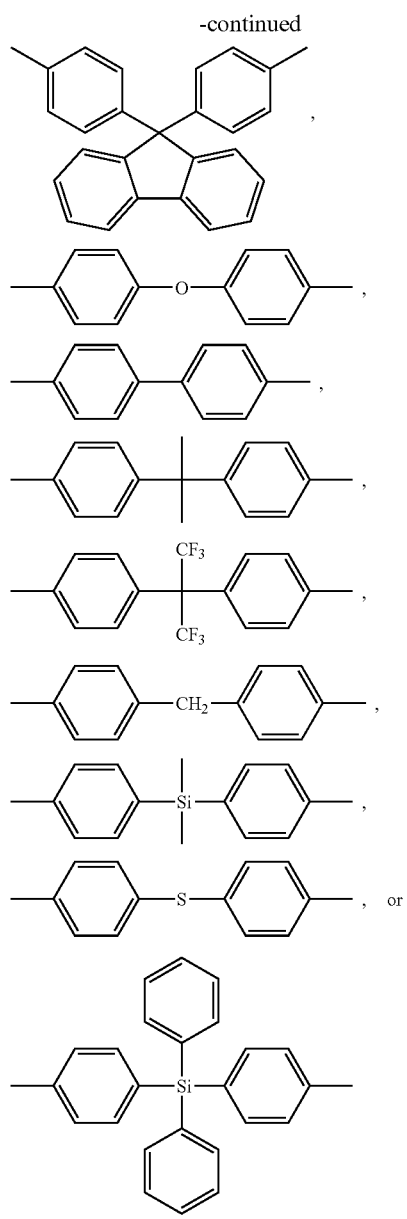
(Wherein, R is —NO$_2$ or —CF$_3$),
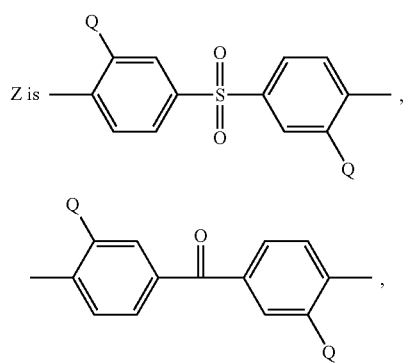
-continued
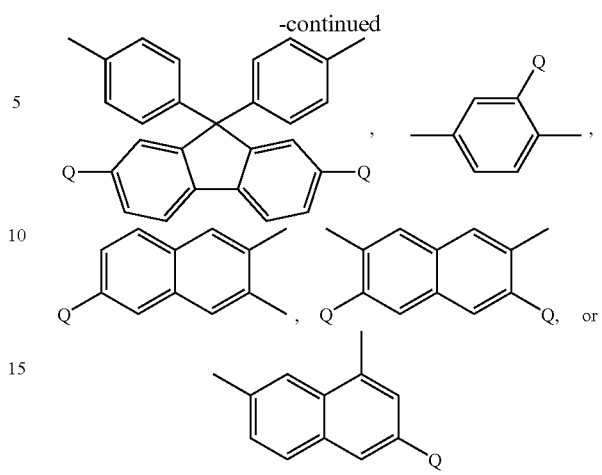
(Wherein, Q is —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$, and M is Na or K),
B is
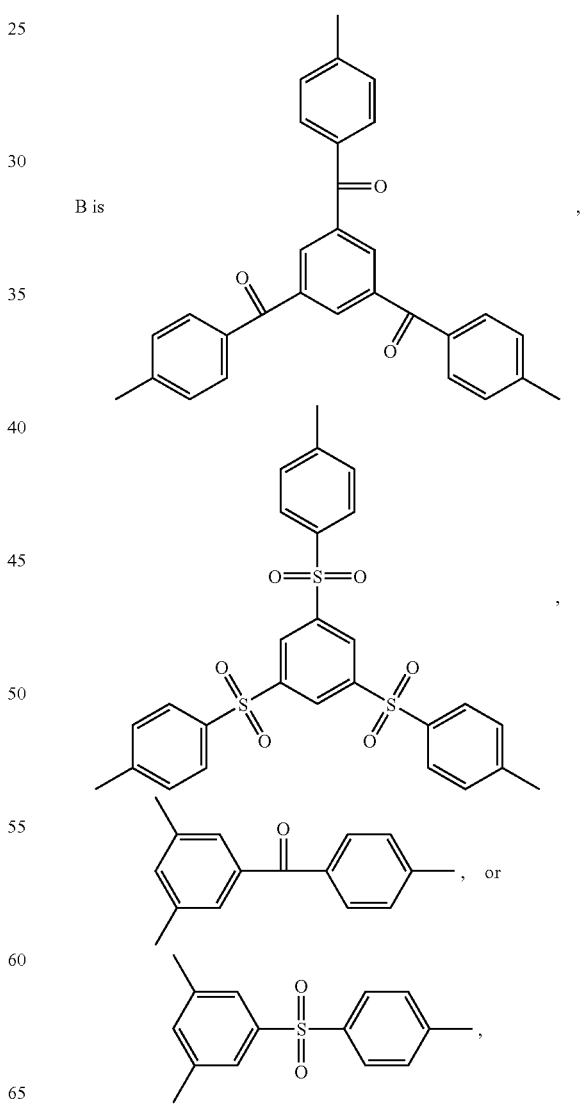

b/a is 0<b/a<1, d/c is 0<d/c<1, m is 1≦m<100, and n is 1≦n<100.

The present invention also provides a preparation method for the branched and sulphonated multi block copolymer comprising the following steps:

a) preparing a branched hydrophobic block by polymerizing bisphenol monomer, aromatic dihalogen monomer and brancher; and b) preparing a hydrophilic block by adding bisphenol monomer or aromatic dihalogen monomer, bisphenol monomer having acid substituents or aromatic dihalogen monomer having acid substituents and brancher to the branched hydrophobic block produced in the above a) for further polymerization and preparing at the same time a branched multi block copolymer.

The present invention further provides a preparation method for a branched and sulphonated multi block copolymer comprising the following steps:

a) preparing a branched hydrophilic block by polymerizing bisphenol monomer or aromatic dihalogen monomer, bisphenol monomer having acid substituents or aromatic dihalogen monomer having acid substituents and brancher; and b) preparing a hydrophobic block by adding bisphenol monomer, aromatic dihalogen monomer and brancher to the branched hydrophobic block produced in the above a) for further polymerization and preparing at the same time a branched multi block copolymer.

The present invention also provides a preparation method for a branched and sulphonated multi block copolymer comprising the following steps:

a) preparing a branched hydrophobic block by polymerizing bisphenol monomer, aromatic dihalogen monomer and brancher;

b) preparing a branched hydrophilic block by polymerizing bisphenol monomer or aromatic dihalogen monomer, bisphenol monomer having acid substituents or aromatic dihalogen monomer having acid substituents and brancher; and c) preparing a branched and sulphonated multi block copolymer by reacting the branched hydrophobic block produced in the above step a) with the branched hydrophilic block produced in the above step b).

The present invention also provides a hydrogenated branched and sulphonated multi block copolymer which is characteristically prepared by adding acid solution to the branched and sulphonated multi block copolymer composed of the repeating unit represented by formula 1 in which Q is $-SO_3^-M^+$, $-COO^-M^+$, $-PO_3H^-M^+$, or $-PO_3^{2-}2M^+$, resulting in the replacement of sulphonate with sulphonic acid.

The present invention further provides a branched and sulphonated multi block copolymer electrolyte membrane which is characteristically prepared by using the above hydrogenated branched and sulphonated multi block copolymer.

The present invention provides a preparation method for the branched sulphonated multi block copolymer electrolyte membrane which is characteristically prepared by the steps of dissolving the hydrogenated branched and sulphonated multi block copolymer in an organic solvent, and preparing a polymer membrane having a regular thickness by solution pouring.

The present invention also provides a fuel cell which is characteristically prepared by using the above branched sulphonated multi block copolymer electrolyte membrane.

The present invention is described in detail hereinafter.

The branched and sulphonated multi block copolymer of the present invention is composed of the repeating unit represented by formula 1.

The branched and sulphonated multi block copolymer composed of the repeating unit represented by formula 1 is produced by polymerizing a branched hydrophobic block not including acid substitutents and a branched hydrophilic block including acid substitutents. So, brancher is able to form main chain of the copolymer without post-sulfonation or cross-linking of sulfonated polymers and hydrophobic block maintaining mechanical integration degree of thin film is chemically bound by turns with hydrophilic block endowing ionic conductivity to thin film instead.

The branched and sulphonated multi block copolymer composed of the repeating unit represented by formula 1 can be prepared by following methods but these methods are the examples to show the preparation processes of the copolymer and the preparation is not always limited thereto.

The preparation method for the branched and sulphonated multi block copolymer is exemplified by followings;

First, the branched and sulphonated multi block copolymer is produced by the steps of a) preparing a branched hydrophobic block represented by the following formula 2 by polymerizing bisphenol monomer, aromatic dihalogen monomer and brancher; and b) preparing a hydrophilic block represented by formula 3 by adding bisphenol monomer or aromatic dihalogen monomer, bisphenol monomer including one or more acid substitutents in phenyl ring or aromatic dihalogen monomer having one or more acid substitutents in phenyl ring to the branched hydrophobic block produced in the above a) for further polymerization and preparing at the same time a branched multi block copolymer composed of the repeating unit represented by formula 1.

Second, the branched and sulphonated multi block copolymer is produced by the steps of a) preparing a hydrophilic block represented by the following formula 3 by polymerizing the above branched hydrophobic block with bisphenol monomer or aromatic dihalogen monomer, bisphenol monomer having one or more acid substitutents in phenyl ring or aromatic dihalogen monomer having one or more acid substitutents in phenyl ring and brancher; and b) adding bisphenol monomer, aromatic dihalogen monomer and a brancher to the branched hydrophilic block prepared in the above step a), followed by polymerization to produce a hydrophobic block represented by the following formula 2; and at the same time, preparing a branched multi block copolymer composed of the repeating unit represented by formula 1.

Third, the branched and sulphonated multi block copolymer is produced by the steps of a) preparing a branched hydrophobic block represented by the following formula 2 by polymerizing bisphenol monomer, aromatic dihalogen monomer and brancher; b) preparing a branched hydrophilic block represented by formula 3 by polymerizing the branched hydrophobic block with bisphenol monomer or aromatic dihalogen monomer, bisphenol monomer having one or more acid substitutents in phenyl ring or aromatic dihalogen monomer having one or more acid substitutents in phenyl ring and brancher; and c) reacting the branched hydrophobic block prepared in step a) with the branched hydrophilic block produced in step b) to produce a branched and sulphonated multi block copolymer composed of the repeating unit represented by formula 1.

[Formula 2]
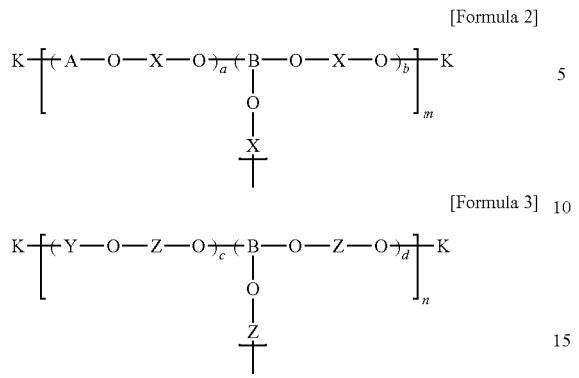
[Formula 3]
In the formula 2 and the formula 3,
A, X, and Y are independently
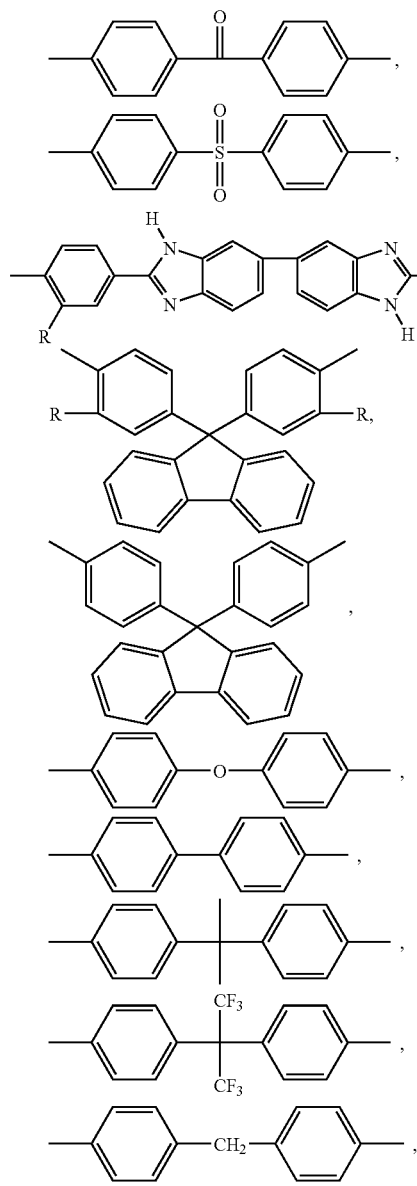
-continued
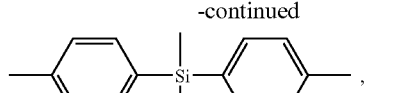
, 
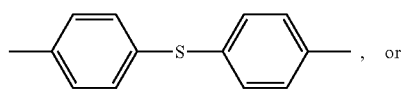
, or
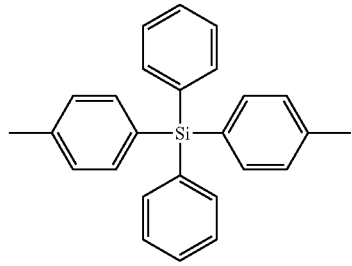
(Wherein, R is —NO$_2$ or —CF$_3$),
Z is 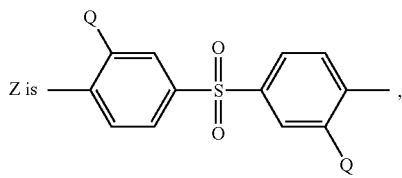,
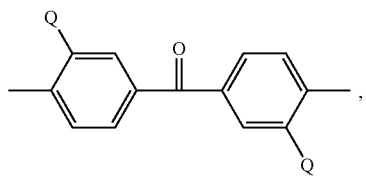,
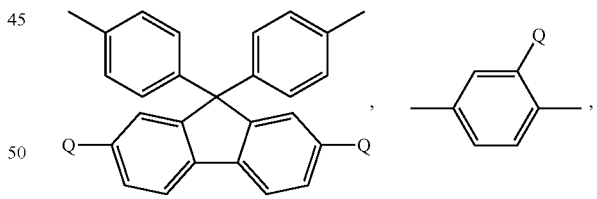,
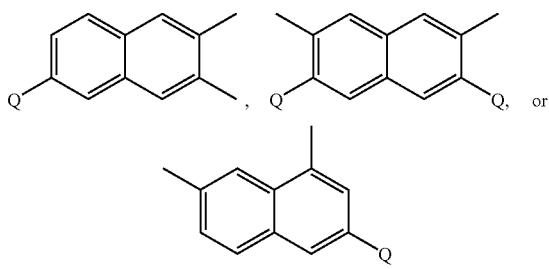
(Wherein, Q is —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$, M is Na or K), B is

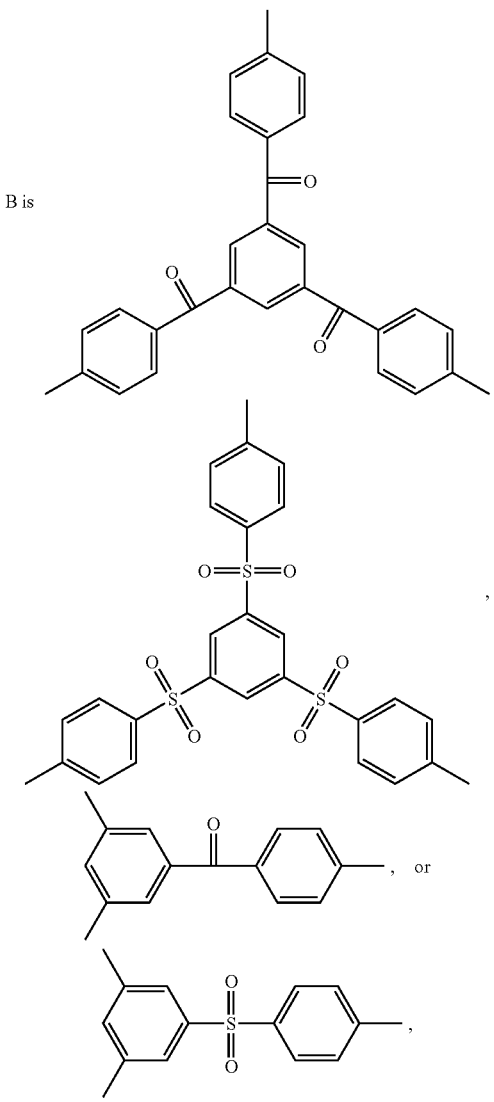
, or

,

K is —F, —Cl, —Br, —I, —NO$_2$, or —OH, b/a is 0<b/a<1, d/c is 0<d/c<1, m is 1≦m<100, and n is 1≦n<100.

Bisphenol monomer or aromatic dihalogen monomer used in the preparation methods above can be one of 4,4'-difluorobenzophenone, bis(4-fluorophenyl)sulfone, 2,2-bis(4-hydroxyphenyl)hexafluoropropane, or 4,4-biphenol.

Bisphenol monomer having one or more acid substituents in phenyl ring or aromatic dihalogen monomer having one or more acid substituents in phenyl ring can be one of hydroquinonesulfonic acid potassium salt, 2,7-dihydroxynaphthalene-3,6-disulfonic acid disodium salt, 1,7-dihydroxynaphthalene-3-sulfonic acid monosodium salt, 2,3-dihydroxynaphthalene-6-sulfonic acid monosodium salt, potassium 5,5'-carnobylbis(2-fluorobenzene sulfonate), or potassium 2,2'-[9,9-bis(4-hydroxyphenyl)fluorene]sulfonate. Among these compounds, 5,5'-carnobylbis(2-fluorobenzene sulfonate) can be produced by direct sulfonation of 4,4-difluorobenzophenone and 4,4-difluorodiphenyl sulfone using fuming sulfuric acid, and 2,2'-[9,9-bis(4-hydroxyphenyl)fluorene]sulfonate can also be produced by direct sulfonation of 9,9-bis(4-hydroxyphenyl)fluorene using ClSO$_3$H.

The brancher is able to form the main chain of the sulphonated multi block copolymer, and is exemplified by [3,5-bis(4-fluorobenzoyl)phenyl](4-fluorophenyl)methanone, [3,5-bis(4-fluorosulfonyl)phenyl](4-fluorophenyl)methanone, 3,5-difluoro-4'-fluorobenzophenone, or 3,5-difluoro-4'-fluorophenyl)sulfone. [3,5-bis(4-fluorobenzoyl)phenyl](4-fluorophenyl)methanone can be produced by friedel-crafts reaction of 1,3,5-benzenetricarbonyltrichloride, aluminum chloride and fluorobenzene, and other branchers having similar structures can also be produced by similar friedel-crafts reaction.

For the production of a branched hydrophilic block and a branched hydrophobic block, a monomer is dissolved in an organic solvent with carbonate anhydride, which is stirred for 3~4 hours at 140~150° C. Then, azotrope is eliminated from the mixture, followed by stirring for 6~24 hours at 170~190° C. for further reaction. Upon completion of the reaction, the reaction product is precipitated, and the precipitate is filtered, washed and dried.

The carbonated anhydride is used as a catalyst, and at this time, any conventional carbonate anhydride can be used but potassium carbonate (K$_2$CO$_3$) is preferred.

The organic solvent is not limited to a specific one as long as it is able to dissolve the reactant and the product, but N,N-dimethylacetamide (DMAc), N-methyl pyrrolidone (NMP), dimethyl sulfoxide (DMSO), or N,N-dimethylformamide (DMF) is preferred.

Then, the mixture is stirred for 3~5 hours at 140~150° C., followed by elimination of toluene and azotrope by dean-stark trap.

The elimination has to be continued until the distilled azotrope does not come out through dean-stark trap any more.

After the complete elimination of the azotrope, the reaction mixture is stirred for 6~24 hours at 170~190° C. for further reaction.

Upon completion of the reaction, salt included in the reaction product is eliminated by putting the product directly into deionized water or methanol or diluting the product with deionized water or methanol for filtering. The residue is precipitated in deionized water. The precipitate is filtered and washed with hot deionized water (~80° C.) and methanol several times, resulting in a hydrophilic or a hydrophobic block copolymer.

The weight average molecular weight of the branched hydrophobic block represented by formula 2, prepared above, is 1,000-500,000 (g/mol) and the weight average molecular weight of the branched hydrophilic block represented by formula 3 is 1,000-500,000 (g/mol).

Coupling reaction is possibly induced between the terminal group (K) of the branched hydrophobic block represented by formula 2 and the terminal group (K) of the branched hydrophilic block represented by formula 3, by which the hydrophobic block and the hydrophilic block is chemically bound by turns, resulting in the preparation of a branched and sulphonated multi block copolymer.

The present invention provides a hydrogenated branched and sulphonated multi block copolymer which is characteristically produced by adding acid solution to the branched and sulphonated multi block copolymer composed of repeating unit represented by formula 1, in which Q is —SO$_3$$^-$M$^+$, —COO$^-$M$^+$, —PO$_3$H$^-$M$^+$, or —PO$_3$$^{2-}$2M$^+$, to substitute sulfonate with sulphonic acid.

That is, when Q of the branched and sulphonated multi block copolymer is —SO$_3$$^-$M$^+$, —COO$^-$M$^+$, —PO$_3$H$^-$M$^+$, or —PO$_3$$^{2-}$2M$^+$, the copolymer includes sulphonated salt. Thus, it is required to substitute the sulphonated salt with sulphonic acid by adding hydrochloric acid or sulfuric acid solution to the copolymer to prepare polymer electrolyte membrane. At this time, it is preferred to treat the branched and sulphonated multi block copolymer with acid solution by the concentration of 0.5-10 M for 1-24 hours.

The present invention provides a branched and sulphonated multi block copolymer electrolyte membrane by using the hydrogenated branched and sulphonated multi block copolymer which is characteristically produced by the steps of dissolving the hydrogenated branched and sulphonated multi block copolymer in a solvent, preferably in a sulphonated copolymer solution, at the concentration of 20% (w/v), and solution pouring, preferable casting the solution on glass plate.

At this time, the solvent can be anyone of possible organic solvents, and precisely, the same organic solvent as used in the preparation of the sulphonated block copolymer is usable.

The casting is performed by conventional methods, and preferably performed to make the electrolyte membrane tens-hundreds μm thick by using film applicator.

Upon casting, the sulphonated copolymer electrolyte membrane is dried in a vacuum oven to eliminate the solvent, resulting in a film type branched and sulphonated multi block copolymer electrolyte membrane. At this time, the temperature is slowly raised from room temperature to 80° C., followed by drying for 24 hours, and then the membrane is further dried for 24 hours at 110° C.

The present invention also provides a fuel cell containing the sulphonated block copolymer electrolyte membrane. The sulphonated block copolymer electrolyte membrane of the present invention has high proton conductivity and excellent mechanical properties and chemical stability, so that it can be used as a proton electrolyte membrane which can be further used as an ion exchange membrane useful for ion conductible polymer thin film that is insoluble in water or methanol, especially for fuel cell for high temperature (for example, polymer electrolyte fuel cell, direct methanol fuel cell, etc).

BRIEF DESCRIPTION OF THE DRAWINGS

FIG. 1 shows the proton conductivities of nafion 115 and branched and sulphonated multi block copolymers produced according to the embodiments of the present invention.

FIG. 2 shows the capacity of polymer electrolyte fuel cell using a branched and sulphonated multi block copolymer produced in an embodiment of the present invention.

FIG. 3 shows the capacity of direct methanol fuel cell using a branched and sulphonated multi block copolymer prepared in an embodiment of the present invention.

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1

Preparation of a Branched Hydrophobic Block Copolymer (Preparation of Brancher)

5 g of 1,3,5-benzenetricarbonyltrichloride (18.8 mol), 6.7 g of aluminum chloride (50.0 mmol) and 50 mL of distilled dichloromethane (DCM) were put in a 250 mL round flask, which was stirred for 30 minutes at 25° C. for reaction in the presence of nitrogen. 20 mL of dichloromethane and 4.5 g of fluorobenzene (48.8 mmol) were added in 100 mL of Dropping funnel, and the fluorobenzene solution was dropped in the round flask drop by drop. The reaction mixture was stirred for 4 hours in the presence of nitrogen, to which 20 mL of distilled water was added. The reaction mixture was stirred further for more than 12 hours. The organic layer of the reaction mixture was extracted by using dichloromethane, and the organic solvent was eliminated, resulting in a crude product. The crude product was re-crystallized using ethanol to give white brancher [3,5-bis(4-fluorobenzoyl)phenyl](4-fluorophenyl) methanone (yield: 70%). The structure of the [3,5-bis(4-fluorobenzoyl)phenyl](4-fluorophenyl)methanone was confirmed by $^1$H-NMR, $^{13}$C-NMR spectrometry and elemental analysis.

$^1$H-NMR (DMSO-$d_6$): δ(ppm) 8.24 (s, 3H), 7.96 (m, 6H), 7.46 (m, 6H)

(Preparation of a Branched Hydrophobic Block)

Dean-stark apparatus was connected to the 500 mL round flask, to which 17.238 g of 4,4'-difluorobenzophenone (79.00 mmol), 1.053 g of [3,5-bis(4-fluorobenzoyl)phenyl](4-fluorophenyl)methanone (2.37 mmol), 24.502 g of 9,9-bis(4-hydroxyphenyl)fluorene (69.92 mmol), 19.327 g of potassium carbonate (139.84 mmol), 200 mL of N-methyl-2-pyrrolidone and 120 mL of benzene were added.

The reaction mixture was stirred in an oil bath for 4 hours at 142° C. in the presence of nitrogen, during which benzene was flowing backward and azotrope attached on molecular sieves of Dean-stark apparatus was completely eliminated with pressurized nitrogen. Then, the reaction temperature was raised to 182° C. and 100 mL of N-methyl-2-pyrrolidone was added, followed by polycondensation for 12 hours.

Upon completion of the reaction, the temperature of the reactant was lowered to 60° C., and then raised again to 120° C. in vacuum condition to eliminate approximately 200 mL of remaining N-methyl-2-pyrrolidone in the reactant.

Then, the temperature of the reactant was lowered to room temperature, to which 300 mL of methyltetrahydrofurane (THF) was added to dilute the reactant. The diluted reactant was put in 3 L of methanol. A copolymer was separated from the solvent and filtered. The cake form copolymer obtained thereby was dried for over 12 hours at 80° C. in a vacuum oven to give white branched hydrophobic block (34.8 g) having weight average molecular weight of 5,000 g/mol and fluorine elements in its terminal group.

Example 2

Preparation of a Branched and Sulphonated Multi Block Copolymer 13.082 g (2.616 mmol) of the branched hydrophobic block produced in the above Example 1 was mixed with 10.162 g (46.572 mmol) of 4,4'-difluorobenzophenone, 0.93 g (2.093 mmol) of [3,5-bis(4-fluorobenzoyl)phenyl](4-fluorophenyl)methanone, 11.945 g (52.328 mmol) of potassium hydroquinonesulfonate, 14.463 g (104.650 mmol) of potassium carbonate, 200 mL of dimethylsulfoxide and 120 mL of benzene.

The reaction mixture was stirred in an oil bath for 4 hours at 142° C. in the presence of nitrogen, during which benzene was flowing backward and azotrope attached on molecular sieves of Dean-stark apparatus was completely eliminated with pressurized nitrogen. Then, the reaction temperature was raised to 182° C. and 100 mL of dimethylsulfoxide was added, followed by polycondensation for 12 hours.

Upon completion of the reaction, 200 mL of dimethylsulfoxide was added to the reactant, which was then diluted. The diluted reactant was loaded in 3 L of methanol. A copolymer was separated from the solvent and filtered. The obtained cake form copolymer was dried for over 12 hours at 80° C. in a vacuum oven to give branched and sulphonated multi block copolymer-1 in which a branched hydrophobic block and a branched hydrophilic block were linked by turns by chemical bond.

Example 3

Preparation of a Branched and Sulphonated Multi Block Copolymer

Branched and sulphonated multi block copolymer-2 was prepared by the same manner as described in Example 2 except that 10.254 g (2.051 mmol) of the branched hydrophobic block prepared in Example 1, 12.231 g (56.055 mmol) of 4,4-difluorobenzophenone, 3.038 g (6.836 mmol) of [3,5-bis(4-fluorobenzoyl)phenyl](4-fluorophenyl)methanone, 11.945 g (52.328 mmol) of potassium hydroquinonesulfonate and 14.464 g (104.657 mmol) of potassium carbonate were used instead.

Example 4

Preparation of a Branched and Sulphonated Multi Block Copolymer

Branched and sulphonated multi block copolymer-3 was prepared by the same manner as described in Example 2 except that 14.102 g (2.820 mmol) of the branched hydrophobic block prepared in Example 1, 7.824 g (35.859 mmol) of 4,4-difluorobenzophenone, 0.716 g (1.612 mmol) of [3,5-bis(4-fluorobenzoyl)phenyl](4-fluorophenyl)methanone, 9.197 g (40.291 mmol) of potassium hydroquinonesulfonate and 11.136 g (80.580 mmol) of potassium carbonate were used instead.

Examples 5~7

Preparations of Hydrogenated Branched and Sulphonated Multi Block Copolymers 10 g of each branched and sulphonated multi block copolymer prepared in Examples 2-4 was dissolved in 10% (w/v) sulfuric acid solution, followed by stirring for 12 hours. The sulfonate in the copolymer was substituted with sulphonic acid, and then the reactant was washed with distilled water and filtered repeatedly until the filtrate became neutral. The filtered sulphonic acid form branched and sulphonated multi block copolymer was dried for 12 hours at 80° C. in a vacuum oven to give hydrogenated branched and sulphonated multi block copolymer.

Examples 8~10

Preparations of Branched and Sulphonated Multi Block Copolymer Electrolyte Membranes 10 g of each hydrogenated branched and sulphonated multi block copolymer prepared in Examples 5-7 was dissolved in 90 mL of N,N-dimethylformamide. The reaction solution was filtered with BORU glass filter (pore size 3) to eliminate dusts. The filtrate (10% w/V) was put in a vacuum condition and the temperature was raised to 120° C. to eliminate remaining N,N-dimethylformamide in the filtrate, resulting in an approximately 20% (w/V) solution.

The solution was loaded on DURAN glass substrate and the thickness of the copolymer solution on the glass substrate was adjusted by film applicator. The copolymer solution on the glass substrate was dried for over 12 hours at 80° C. in a vacuum oven, resulting in a branched and sulphonated multi block copolymer electrolyte membrane having the thickness of 50~120 μm.

IEC (ion exchange capacity), proton conductivity, MeOH crossover, water/methanol absorptivity of the branched and sulphonated multi block copolymers produced in the above Examples 8-10 and the capacities of proton exchange membrane fuel cell and direct methanol fuel cell were measured.

a) IEC 0.5 g of each branched and sulphonated multi block copolymer electrolyte membrane prepared in Examples 8-10 was hydrolyzed for 2 hours in ultrapure water at 100° C., which was dipped in 100 mL of NaCl solution for 10 hours to substitute hydrogen ion (H+) with sodium ion (Na+). The substituted hydrogen ion (H+) was titrated in 0.1 N NaOH standard solution, and IEC value was calculated according to the mathematical formula 1 by measuring the amount of NaOH used for titration. The results are shown in Table 1. At this time, IEC value of nafion 115 provided by Du Pont was used as a comparative data.

$$IEC(-SO_3H\ mequiv./g)=(Consumed\ NaOH\ standard\ solution\ (mL)\times 0.1\ N)/Weight\ of\ dried\ thin\ film\ (g)$$ [Mathematical Formula 1]

TABLE 1

| Compartment | IEC (mequiv./g) | Apparent Property | Stress (Mpa) | Strain (%) |
|---|---|---|---|---|
| Example 8 | 1.44 | Transparent, Excellent mechanical strength | 61.5 | 120 |
| Example 9 | 1.65 | Transparent, Excellent mechanical strength | 64.8 | 80 |
| Example 10 | 1.26 | Transparent, Excellent mechanical strength | 52.4 | 160 |
| Nafion 115 | 0.91 | Transparent, Good mechanical strength | 15.7 | 150 |

As shown in Table 1, the branched and sulphonated multi block copolymer electrolyte membranes prepared in Examples 8-10 showed excellent IEC capacities, compared with that of nafion that has been applied to the conventional polymer membranes. The apparent properties, stress and strain were all similar to or the same as those of nafion.

b) Proton Conductivity

Proton conductivity of each branched and sulphonated multi block copolymer electrolyte membrane prepared in Examples 8-10 was also measured by potentio-static two-probe method.

1×1 (cm$^2$) and 1.5×1.5 (cm$^2$) of carbon paper electrodes were faced each other on both sides of a sample having 2×2 (cm$^2$) of area with a fixed pressure, ultrapure water was flowing outside of it, and 5 mV of AC voltage was given to the both ends of the electrodes with 1 MHz~100 Hz of frequency. At this time, impedance was obtained from alternating current flowing the both ends of the electrodes, which was used for the measurement of proton conductivity of each branched and sulphonated multi block copolymer electrolyte membrane.

Proton conductivities of the branched and sulphonated multi block copolymer electrolyte membranes and nafion 115 were measured and the results are shown in FIG. 10. As shown in FIG. 10, the branched and sulphonated multi block copolymer electrolyte membranes were proved to have the same or the improved proton conductivities, compared with nafion which has been applied to the conventional polymer membranes.

c) MeOH Crossover

MeOH crossover of each branched and sulphonated multi block copolymer electrolyte membrane prepared in Examples 8-10 was measured by using diffusion cell device.

10 M of methanol solution was put in the left cell and pure water was put in the right cell. The branched and sulphonated multi block copolymer electrolyte membranes of Examples 8-10 were inserted in between the cells. Sampling of the solution was performed in the right cell, during which the changes of methanol concentration ($C_i(t)$) in the left cell according to the time (t) consumed for sampling were observed to calculate MeOH crossover. The MeOH crossover ($D_i \cdot K_i$) is calculated by following mathematical formula 2, in which the thickness of electrolyte (L) and exposed area of membrane (A), volume of the left cell (V) and initial concentration ($C_{io}$) of methanol in the right cell were all considered.

$$C_i(t) = \{(A \cdot D_i \cdot K_i \cdot C_{io})/V \cdot L\} \times t$$ [Mathematical Formula 2]

TABLE 2

| Compartment | Example 8 | Example 9 | Example 10 | Nafion 115 |
|---|---|---|---|---|
| Room Temp. | 8.92E−7 | 1.51E−6 | 6.36E−7 | 2.40E−6 |
| 40° C. | 1.40E−6 | 1.98E−6 | 9.53E−7 | 3.43E−6 |
| 60° C. | 2.41E−6 | 3.15E−6 | 1.68E−6 | 5.50E−6 |
| 80° C. | 2.92E−6 | 4.43E−6 | 2.24E−6 | 7.16E−6 |

As shown in Table 2, it was proved that the branched and sulphonated multi block copolymer electrolyte membranes of Examples 8-10 had improved MeOH crossover at high temperature, compared with nafion that has been applied to the conventional polymer membranes.

d) Water/Methanol Absorptivity

Each of branched and sulphonated multi block copolymer electrolyte membrane of Examples 8-10 was hydrolyzed for 4 hours in ultrapure water or in methanol at room temperature, 40° C., 60° C., 80° C., and 100° C. Moisture or methanol on the surface of the membrane was eliminated and the weight of the membrane was measured. The membrane was dried for over 12 hours in a vacuum oven at 100° C., followed by measuring the weight of the membrane. Water or methanol absorptivity was calculated by the following mathematical formula 3.

Absorptivity (%) = {(Weight of absorbed membrane−
Weight of dried membrane)/Weight of dried
membrane} × 100 [Mathematical Formula 3]

tivities, compared with nafion that has been applied to the conventional polymer membranes.

e) Capacity of Polymer Electrolyte Fuel Cell

Considering conductivity, mechanical integration degree and other properties of ion electrolyte membrane, the branched and sulphonated multi block copolymer electrolyte membrane 100 μm in thickness prepared in the above Example 10 was used for the evaluation of polymer electrolyte fuel cell capacity. At this time, 5 layered MEA (membrane electrode assembly) was prepared and 0.5 mg Pt/cm$^2$ was loaded on both anode and cathode. The electrode size was 5×5 cm$^2$ and the electrolyte membrane size was 10×10 cm$^2$. To prepare catalyst slurry which would be dispersed evenly without aggregation, proper amount of IPA, nafion solution and water (10 weight % of catalyst ink solvent) were mixed, resulting in a well-dispersed mixed solvent. The solvent was mixed with a catalyst, followed by stirring. Ultrasonication was performed for 5 minutes, followed by pulverizing the catalyst cluster by ball milling to make it smaller particles.

The conditions for hot press for the branched and sulphonated multi block copolymer electrolyte membrane prepared in Example 10 and GDE were as follows; the temperature of the hot presser was raised to 140° C., which was maintained for 5 minutes at 0.1 ton to make sure the heat was transmitted enough. Then, it stood at 1.0 ton for 2 minutes to let the electrolyte membrane and GDE were adhered tightly.

The resulting MEA was assembled in a single cell and the capacity of the polymer electrolyte fuel cell was measured under following conditions; unit cell temperature was 70° C., flow rate of each H$_2$ and air was 300 sccm and 1200 sccm respectively, the temperatures of bubbler lines of anode and cathode were set at 80° C. and 85° C., and humidity was 100%. OCV was over 1.0 V and pulse was given at constant voltage mode. The results are shown in FIG. 2. As a result, the branched and sulphonated multi block copolymer electrolyte membrane produced in Example 10 has 0.6 A/cm$^2$ capacity at 0.6V.

f) Capacity of Direct Methanol Fuel Cell

Considering conductivity, mechanical integration degree and other properties of ion electrolyte membrane, the branched and sulphonated multi block copolymer electrolyte membrane 100 μm in thickness prepared in Example 10 was used for the evaluation of capacity of direct methanol fuel cell. Pt—Ru black was used as an anode catalyst, and Pt black was used as a cathode catalyst. To prepare catalyst slurry which would be dispersed well without aggregation, proper amount of IPA, nafion solution and water (10 weight % of catalyst ink solvent) were mixed, resulting in a well-dispersed mixed solvent. The solvent was mixed with a catalyst, fol-

TABLE 3

| | Example 8 | | Example 9 | | Example 10 | | Nafion 115 | |
|---|---|---|---|---|---|---|---|---|
| Compartment | Water | MeOH | Water | MeOH | Water | MeOH | Water | MeOH |
| Room Temp. | 18 | 30 | 30 | 50 | 15 | 22 | 18 | 52 |
| 40° C. | 24 | 45 | 42 | 80 | 20 | 35 | 25 | 85 |
| 60° C. | 40 | 60 | 55 | 100 | 28 | 50 | 28 | 130 |
| 80° C. | 50 | — | 84 | — | 35 | — | 32 | — |
| 100° C. | 65 | — | 100 | — | 46 | — | 38 | — |

As shown in Table 3, it was proved that the branched and sulphonated multi block copolymer electrolyte membranes of Examples 8-10 had excellent water and methanol absorplowed by stirring. Ultrasonication was performed for 5 minutes, followed by pulverizing the catalyst cluster by ball milling to make it smaller particles.

The branched and sulphonated multi block copolymer electrolyte membrane 100 μm in thickness prepared in the above Example 10 was inserted in clamping device, which was heated behind for 20 minutes in a thermal dryer (80° C.) to eliminate moisture completely.

0.1~20 cc/cm² of the resulting catalyst ink was taken and sprayed on the front of grid using spray gun, resulting in under 30 μm active layer (2 mg/cm²). The carrier gas pressure was 0.01~2 atmospheric pressure. Catalyst slurry solvent was serially evaporated during the spray coating by heating with a thermal drier the branched and sulphonated multi block copolymer electrolyte membrane of Example 10 behind grid.

The electrodes generated above were hot-pressed, including active layer and the branched and sulphonated multi block copolymer electrolyte membrane produced in Example 10 in between, for 3~10 minutes at 140° C. under the pressure of 5~100 kg/cm², resulting in the final MEA. At this time, the electrolyte membrane was a little bigger than the electrode. The electrode size was 3×3 cm² and the electrolyte membrane size was 6×6 cm². The output density of the produced electrode-electrolyte membrane assembly (MEA) was measured by the following conditions and the results are shown in FIG. 3.

| Operating Temperature | 80° C. |
|---|---|
| Amount of Catalyst | 2 mg/cm² |
| Fuel | 2M CH₃OH |
| Oxygen | 1000 cc/min 1 kfg pressing |

As shown in FIG. 3, the capacity of the branched and sulphonated multi block copolymer electrolyte membrane produced in Example 10 was 0.54 A/cm² at 0.3 V.

INDUSTRIAL APPLICABILITY

The electrolyte membrane of the present invention has not only high proton conductivity but also excellent mechanical properties and chemical stability. In addition, the electrolyte membrane of the invention can be effectively used for the preparation of thin film because it has the effects of regulating the distribution, the location and the number of sulfonic acid group in polymer backbone and does not reduce membrane properties with the increase of the number of sulfonic acid group.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A branched and sulphonated multi block copolymer composed of the repeating unit represented by the following formula 1:

[Formula 1]

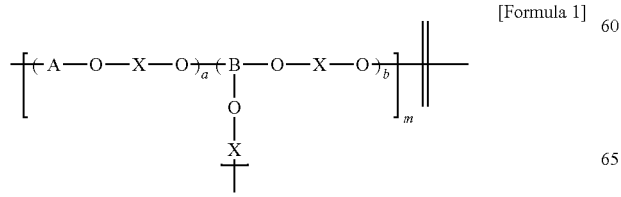

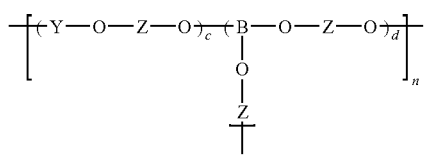

In the formula 1,

A and Y are independently

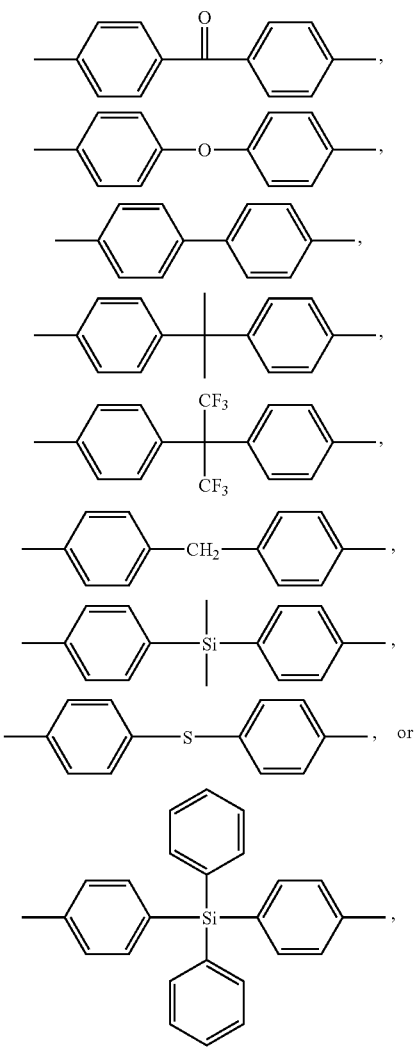

X is

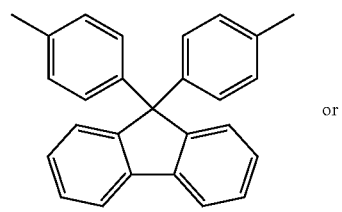

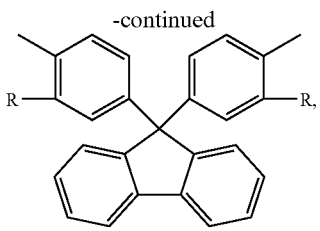

wherein R is —NO₂ or —CF₃,

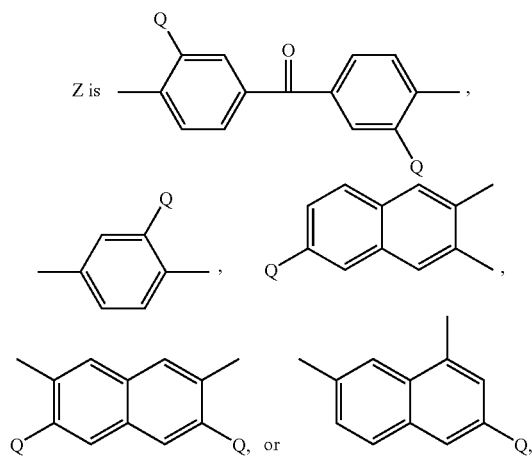

wherein Q is —SO$_3$H, SO$_3^-$M$^+$, —COOH, —COO$^-$M$^+$, —PO$_3$H$_2$, —PO$_3$H$^-$M$^+$, or —PO$_3^{2-}$2M$^+$, and M is Na or K, B is

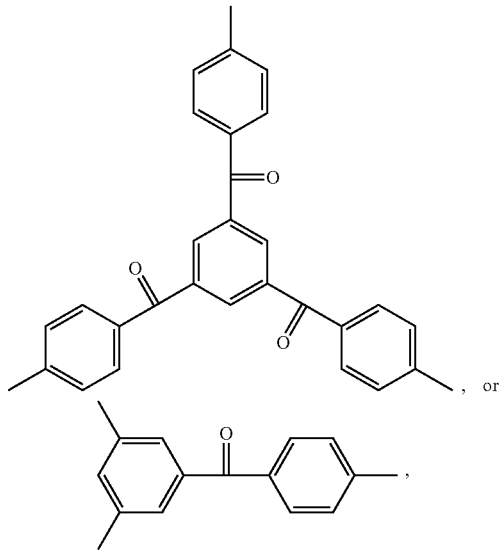

b/a is 0<b/a<1, d/c is 0<d/c<1, m is 1≦m<100, and n is 1≦n<100.

2. A preparation method for the branched and sulphonated multi block copolymer of claim 1 comprising the following steps:

a) preparing a branched hydrophobic block by polymerizing bisphenol monomer, aromatic dihalogen monomer and brancher; and b) preparing a hydrophilic block by adding bisphenol monomer or aromatic dihalogen monomer, bisphenol monomer having acid substituents or aromatic dihalogen monomer having acid substituents and brancher to the above branched hydrophobic block of step a) for polymerization and preparing a branched multi block copolymer at the same time.

3. A preparation method for the branched and sulphonated multi block copolymer of claim 1 comprising the following steps:

a) preparing a branched hydrophilic block by polymerizing bisphenol monomer or aromatic dihalogen monomer, bisphenol monomer having acid substituents or aromatic dihalogen monomer having acid substituents and brancher; and b) preparing a hydrophobic block by adding bisphenol monomer, aromatic dihalogen monomer and brancher to the branched hydrophilic block produced in the above a) for further polymerization and preparing a branched multi block copolymer at the same time.

4. A preparation method for the branched and sulphonated multi block copolymer of claim 1 comprising the following steps:

a) preparing a branched hydrophobic block by polymerizing bisphenol monomer, aromatic dihalogen monomer and brancher;

b) preparing a branched hydrophilic block by polymerizing bisphenol monomer or aromatic dihalogen monomer, bisphenol monomer having acid substituents or aromatic dihalogen monomer having acid substituents and brancher; and c) preparing a branched and sulphonated multi block copolymer by reacting the branched hydrophobic block produced in the above step a) with the branched hydrophilic block produced in the above step b).

5. The preparation methods for the branched and sulphonated multi block copolymers as set forth in claim 2, wherein the brancher is one or more compounds selected from a group consisting of [(3,5-bis(4-fluorobenzoyl)phenyl](4-fluorophenyl)methanone, and 3,5-difluoro-4'-fluorobenzophenone.

6. The preparation methods for the branched and sulphonated multi block copolymer electrolyte membranes as set forth in claim 2, wherein the weight average molecular weight of the branched hydrophobic block is 1,000-500,000 (g/mol) and the weight average molecular weight of the branched hydrophilic block is 1,000-500,000 (g/mol).

7. A hydrogenated branched and sulphonated multi block copolymer which is characteristically produced by substituting sulfonate with sulfonic acid by adding acid solution to the branched and sulphonated multi block copolymer of claim 1 in which Q is —SO$_3^-$M$^+$, —COO$^-$M$^+$, —PO$_3$H$^-$M$^+$, or —PO$_3^{2-}$2M$^+$.

8. The hydrogenated branched and sulphonated multi block copolymer as set forth in claim 7, wherein the acid solution is added to the branched and sulphonated multi block copolymer by the concentration of 0.5-10 M.

9. A branched and sulphonated multi block copolymer electrolyte membrane which is characterized by being produced from the hydrogenated branched and sulphonated multi block copolymer of claim 8.

10. A preparation method for the branched and sulphonated multi block copolymer electrolyte membrane which characteristically includes the steps of dissolving the branched and sulphonated multi block copolymer of claim 1 in an organic solvent and performing solution pouring to prepare a polymer membrane having a regular thickness.

11. A fuel cell which is characteristically applied to the branched and sulphonated multi block copolymer electrolyte membrane of claim 10.

12. The fuel cell as set forth in claim 11, in which the fuel cell is polymer electrolyte fuel cell or direct methanol fuel cell.

13. The preparation methods for the branched and sulphonated multi block copolymers as set forth in claim 3, wherein the brancher is one or more compounds selected from a group consisting of [(3,5-bis(4-fluorobenzoyl)phenyl](4-fluorophenyl)methanone, and 3,5-difluoro-4'-fluorobenzophenone.

14. The preparation methods for the branched and sulphonated multi block copolymer electrolyte membranes as set forth in claim 3, wherein the weight average molecular weight of the branched hydrophobic block is 1,000-500,000 (g/mol) and the weight average molecular weight of the branched hydrophilic block is 1,000-500,000 (g/mol).

15. The preparation methods for the branched and sulphonated multi block copolymers as set forth claim 4, wherein the brancher is one or more compounds selected from a group consisting of [(3,5-bis(4-fluorobenzoyl)phenyl](4-fluorophenyl)methanone, and 3,5-difluoro-4'-fluorobenzophenone.

16. The preparation methods for the branched and sulphonated multi block copolymer electrolyte membranes as set forth in claim 4, wherein the weight average molecular weight of the branched hydrophobic block is 1,000-500,000 (g/mol) and the weight average molecular weight of the branched hydrophilic block is 1,000-500,000 (g/mol).

* * * * *